United States Patent
Harring, III

(10) Patent No.: US 11,987,400 B2
(45) Date of Patent: May 21, 2024

(54) EXPANDABLE DECOY UNMANNED AERIAL VEHICLES

(71) Applicant: Insitu, Inc., Bingen, WA (US)

(72) Inventor: Donald Calvin Harring, III, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 18 days.

(21) Appl. No.: 17/503,233

(22) Filed: Oct. 15, 2021

(65) Prior Publication Data

US 2022/0144428 A1 May 12, 2022

Related U.S. Application Data

(60) Provisional application No. 63/110,806, filed on Nov. 6, 2020.

(51) Int. Cl.
*B64U 20/70* (2023.01)
*B64C 1/34* (2006.01)
*B64U 101/19* (2023.01)

(52) U.S. Cl.
CPC .............. *B64U 20/70* (2023.01); *B64C 1/34* (2013.01); *B64U 2101/19* (2023.01)

(58) Field of Classification Search
CPC ......... B64C 1/34; B64C 3/30; B64B 2201/00; B64U 20/70; B64U 2101/19; F41J 9/08; F41J 9/10
See application file for complete search history.

(56) References Cited

U.S. PATENT DOCUMENTS

| | | | | |
|---|---|---|---|---|
| 2006/0261213 A1* | 11/2006 | Lavan | .................. | B64C 3/30 244/30 |
| 2009/0314880 A1* | 12/2009 | Rawdon | .................. | B64B 1/34 244/30 |
| 2010/0230533 A1* | 9/2010 | Greiner | .................. | B64B 1/60 244/30 |
| 2010/0270424 A1* | 10/2010 | DeLaurier | .................. | B64B 1/06 40/212 |
| 2017/0217562 A1* | 8/2017 | Schalla | .................. | B64C 39/024 |
| 2019/0012943 A1* | 1/2019 | Beser | .................. | G09F 21/10 |
| 2019/0347950 A1* | 11/2019 | Armstrong | .................. | F42B 15/01 |

* cited by examiner

*Primary Examiner* — Joshua J Michener
*Assistant Examiner* — Arfan Y. Sinaki
(74) *Attorney, Agent, or Firm* — HANLEY, FLIGHT & ZIMMERMAN, LLC

(57) ABSTRACT

Expandable decoy unmanned aerial vehicles (UAVs) are disclosed. A disclosed example decoy UAV includes an expandable body at least partially defining an exterior of the expandable decoy UAV, an expander to expand the expandable body to a desired footprint, and a propulsion device operatively coupled to the expandable body, the propulsion device to move the expandable decoy UAV.

20 Claims, 9 Drawing Sheets

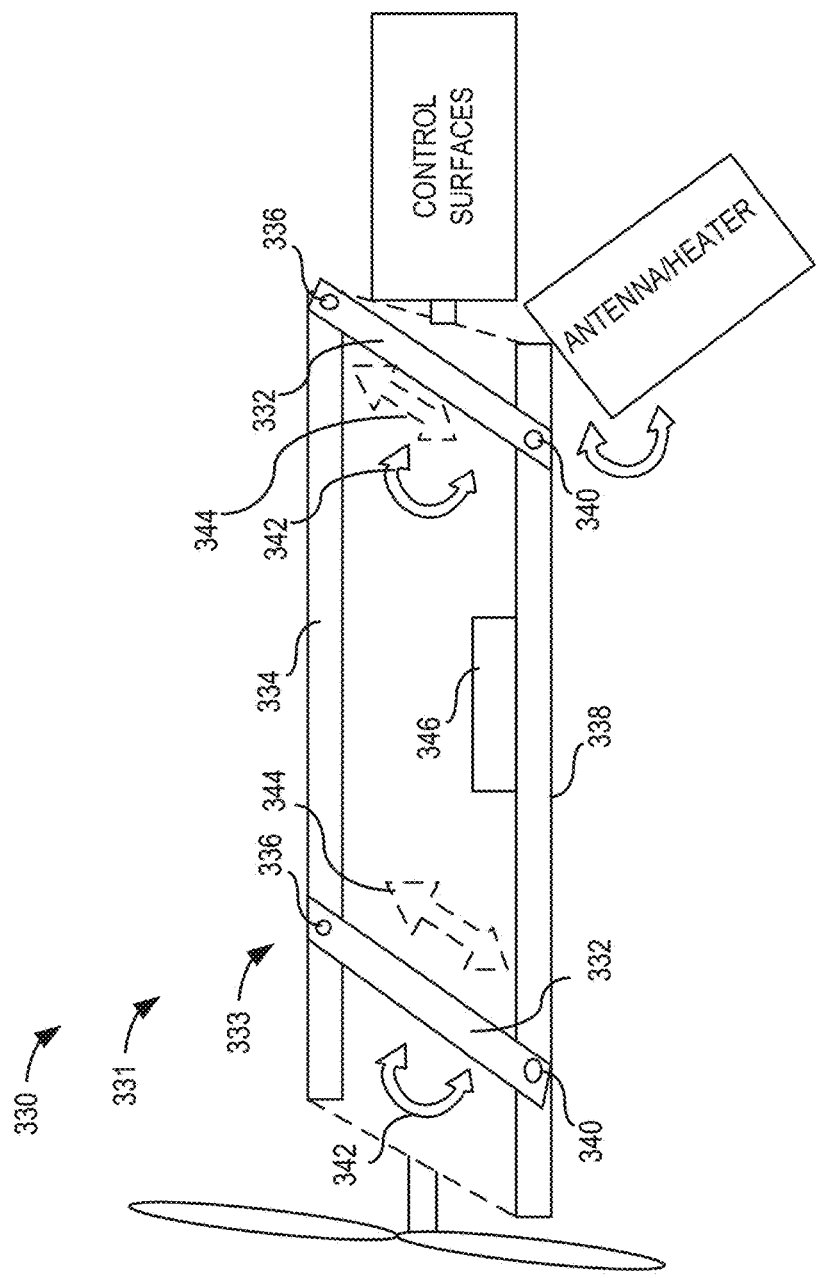

EXPANDABLE DECOY UNMANNED AERIAL VEHICLES

RELATED APPLICATION

This patent claims the benefit under 35 U.S.C. § 119(e) to U.S. Provisional Application No. 63/110,806, titled "Expandable Decoy Unmanned Aerial Vehicles," and filed on Nov. 6, 2020. U.S. Provisional Application No. 63/110,806 is hereby incorporated by this reference in its entirety.

FIELD OF THE DISCLOSURE

This disclosure relates generally to unmanned aerial vehicles (UAVs) and, more particularly, to expandable decoy UAVs.

BACKGROUND

Typically, an aircraft, such as an unmanned aerial vehicle (UAV) performing a mission in a hostile area can be susceptible to attacks or malicious interference. In particular, the UAV can be damaged, destroyed and/or incapacitated by hostile measures, such as missiles, for example, when flying over the hostile area. As a result, the UAV may be prevented from successfully performing its mission. These hostile measures can be aimed and/or guided toward the UAV based on visual or thermal indications of the UAV.

SUMMARY

An example decoy UAV includes an expandable body at least partially defining an exterior of the expandable decoy UAV, an expander to expand the expandable body to a desired footprint, and a propulsion device operatively coupled to the expandable body, the propulsion device to move the expandable decoy UAV.

An example method of operating an expandable decoy UAV includes deploying the expandable decoy UAV, expanding, via an expander, an expandable body of the expandable decoy UAV to a desired footprint, the expandable body at least partially defining an exterior surface of the expandable decoy UAV, and directing, by executing an instruction with at least one processor, a propulsion device of the expandable decoy UAV to move the expandable decoy UAV.

An example non-transitory machine readable medium includes instructions which, when executed, cause at least one processor to cause an expandable decoy UAV to deploy, cause an expandable body of the expandable decoy UAV to expand to a desired footprint via an expander, the expandable body at least partially defining an exterior surface of the expandable decoy UAV, and direct a propulsion system to move the expandable decoy UAV.

An example UAV includes means for supporting the expandable decoy UAV, means for expanding the means for supporting to a desired footprint, and means for moving the expandable decoy UAV.

BRIEF DESCRIPTION OF THE DRAWINGS

FIGS. 3A-3D are cross-sectional views of example expandable decoy UAVs in accordance with teachings of this disclosure.

Figure 1:
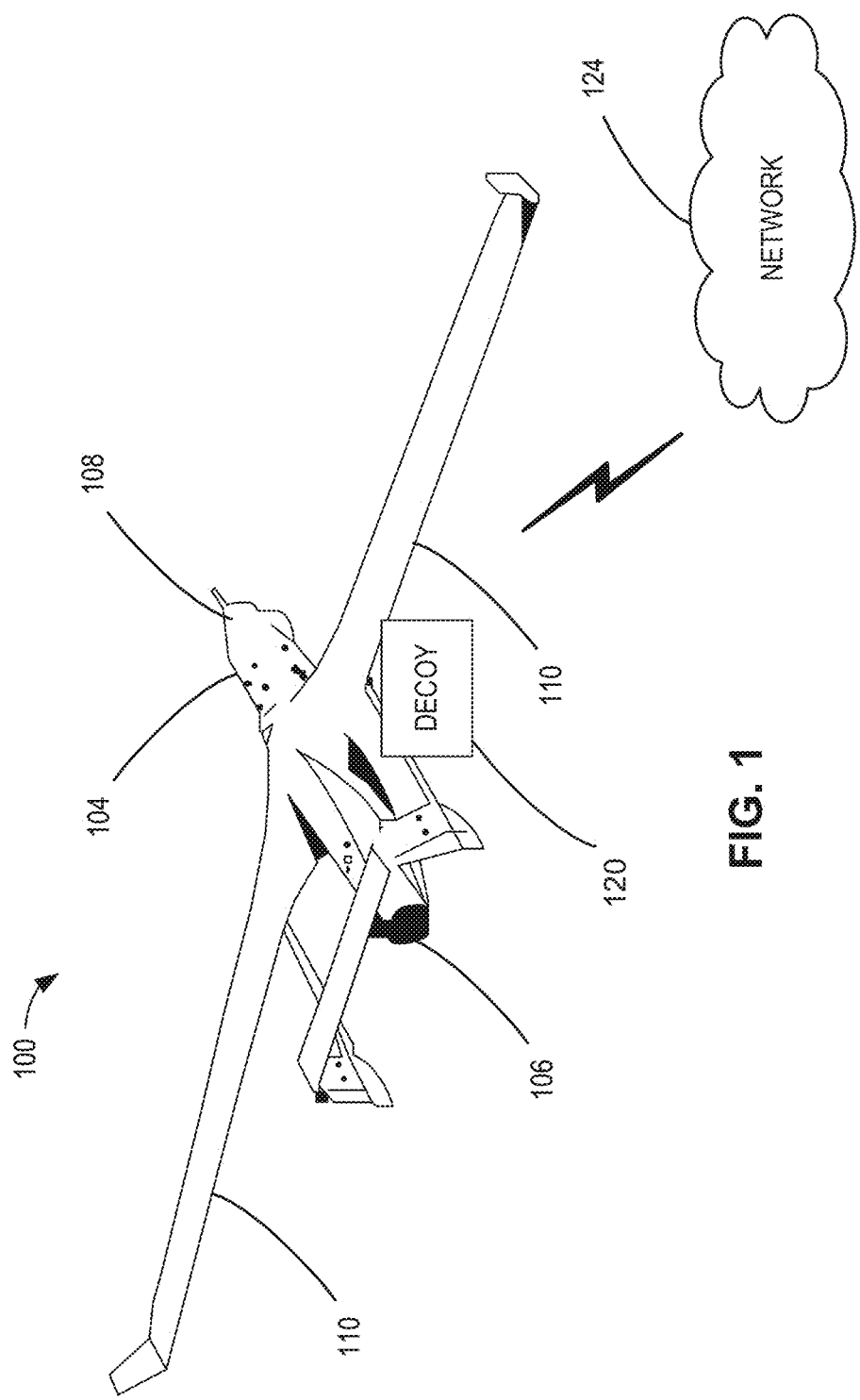
FIG. 1 illustrates an example aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Expandable decoy unmanned aerial vehicles (UAVs) are disclosed. A mission UAV that is performing a mission in a hostile area can be subject to attack or malicious interference. In particular, the mission UAV can be targeted by missiles or other weapons, any of which can be aimed and/or directed toward the mission UAV based on a visual or thermal indication of the mission UAV. Generally, UAVs can have a substantial monetary value and/or include proprietary or classified information and, thus, destruction or capture of these UAVs can be highly undesirable.

Examples disclosed herein provide an effective, compact, light-weight and relatively low cost countermeasure solution to prevent mission aircraft (e.g., UAVs) from being damaged or destroyed. Particularly, examples disclosed herein can draw attacks and/or detection measures away from the mission aircraft. As a result, examples disclosed herein can improve a likelihood of success of a mission being performed by the mission aircraft. In particular, examples disclosed herein correspond to decoy UAVs that are expandable to a desired footprint or geometry that resembles or approximates the mission aircraft (e.g., visually, a similar overall outline, radar signature, thermal signature, etc.). Examples disclosed herein can mimic UAVs while being light and relatively low cost by implementing hobby grade hardware, for example.

Example decoy UAVs disclosed herein implement an expandable body that at least partially defines an external surface of a decoy UAV and is expanded to a desired footprint by an expander (e.g., an expansion device or assembly). Particularly, the desired footprint is utilized to mimic a footprint of the mission aircraft. A propulsion device and/or system (e.g., a propeller) is operatively coupled to and/or integrated with the decoy UAV to cause movement of the decoy UAV.

In some examples, the decoy UAV is deployed from a mission UAV so that the decoy UAV can mimic the mission UAV. In particular, the decoy UAV can be deployed from the mission UAV during flight of the mission UAV to draw attacks away from the mission UAV while the mission UAV performs its mission. In some examples, the decoy UAV includes an antenna and/or transceiver to transmit radio frequency (RF) signals to mimic or simulate RF transmissions of the mission UAV. Additionally or alternatively, the decoy UAV includes a heater or other heat emitting device to emit a heat signature similar to that of the mission UAV.

In some examples, the expander of the decoy UAV includes a pivotable body (e.g., a pivoting rod) to rotate and expand the expandable body. Additionally or alternatively, the expander includes a height adjustable rod with a variable longitudinal length to expand the decoy UAV. In some examples, the expandable body includes an inflatable balloon. In some examples, the expandable body includes an upper surface and a lower surface opposite of the upper surface, where the expandable body is to be expanded by moving the first upper surface and the second lower surface apart from one another.

As used herein, the term "mission aircraft" refers to an aircraft which a decoy is to mimic. For example, the term "mission aircraft" can correspond to a UAV that flies into a mission area to perform a mission. As used herein, the term "decoy" refers to an aircraft and/or vehicle used to draw and/or divert unwanted attention/detection, hostile measures and/or attacks away from a mission vehicle or aircraft. As used herein, the term "expandable" refers to an object, device and/or assembly that can be expanded to a desired footprint or shape. As used herein, the term "expander" refers to a device, system, assembly, process (e.g., inflating) and/or component used to expand at least a portion of an aircraft and/or a vehicle. As used herein, the terms "footprint" and "desired footprint" refer to a representation of an object as two-dimensional or three dimensional. For example, the terms "footprint" and "desired footprint" can refer to a silhouette or outline of the object. Additionally or alternatively, the terms "footprint" and "desired footprint" can refer to an overall geometry or shape of the object.

FIG. 1 illustrates an example aircraft (e.g., an aerial vehicle, a mission aircraft vehicle, etc.) 100 in which examples disclosed herein can be implemented. The aircraft 100 includes a fuselage 104, a propulsion device or system 106, a control system (e.g., a guidance system) 108, and wings 110. As can be seen in FIG. 1, the aircraft 100 includes a decoy aircraft 120 that is implemented as a UAV in this example and releasably couplable to the aircraft 100. In the illustrated example of FIG. 1, the aircraft 100 is an unmanned aerial vehicle (UAV). In other examples, however, the aircraft 100 may be a manned vehicle. In various examples, the aircraft 100 may be piloted by a human or may be an autonomous vehicle with passengers, cargo or other payload. In yet other examples, a rotorcraft (e.g., a quadcopter) can be implemented instead.

In operation, to perform a mission, the aircraft 100 is directed and/or navigated by a control network 124 based on GPS signals received at the aircraft 100. In particular, the GPS signals are utilized by the control system 108 to direct movement of the aircraft 100. For example, the control system 108 can be controlled and/or directed by a remote command center (e.g., a ground-based command center) based on the aforementioned GPS signals. While the aircraft 100 is performing the mission, the aircraft 100 can be subject to hostile measures including, but not limited to, missile attacks, gun fire, jamming, etc. According to examples disclosed herein, the aircraft 100 deploys the decoy UAV 120 that mimics characteristics of the aircraft 100 to prevent the aircraft 100 from being destroyed, lost and/or captured while the aircraft 100 performs its mission. In other examples, the decoy UAV 120 can be deployed or launched from the ground (e.g., via a ground-based launch or takeoff, etc.) or other vehicle, such as a ground-based or water-based vehicle.

Figure 2:
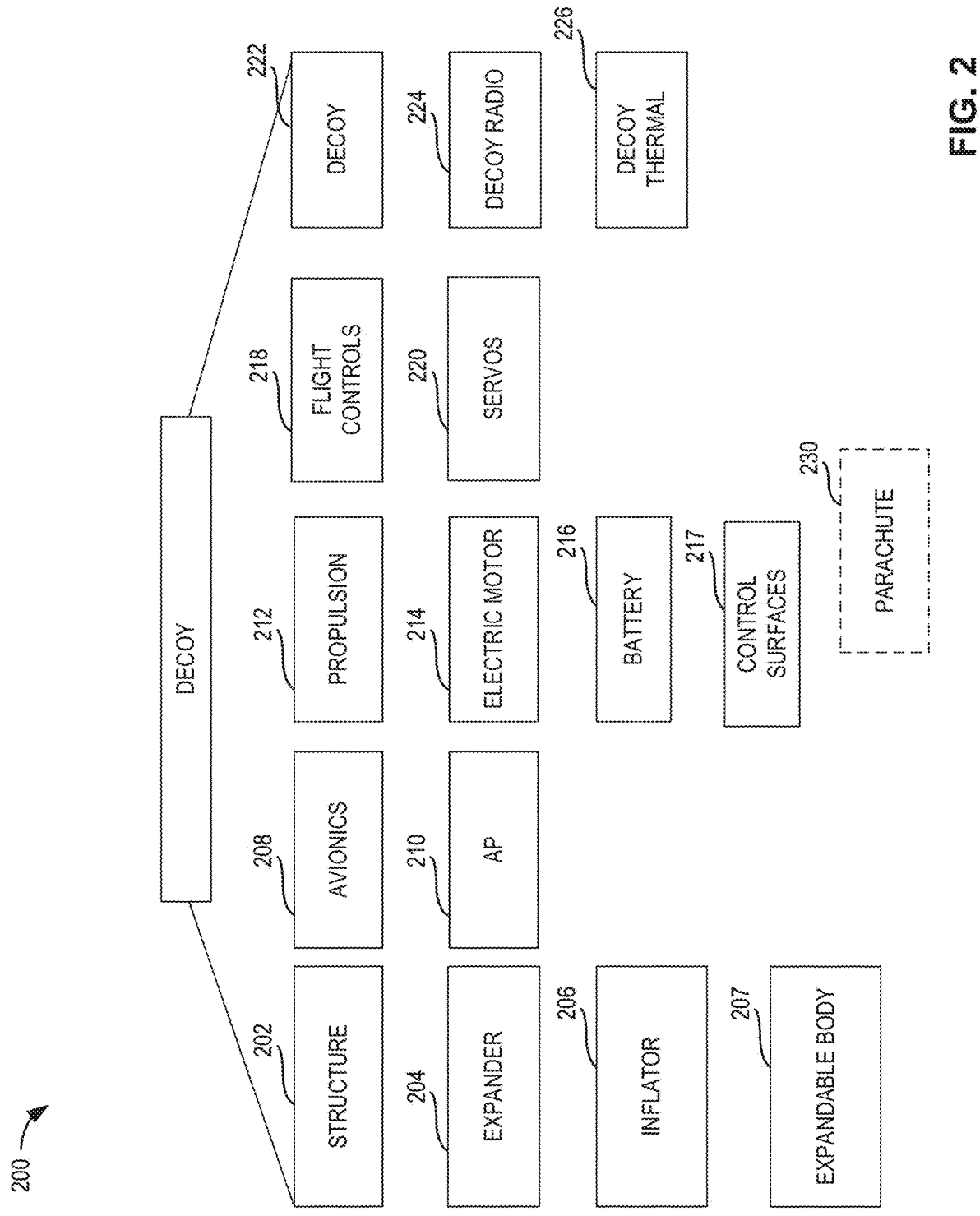
FIG. 2 is a block diagram of an example decoy unmanned aerial vehicle (UAV) in accordance with teachings of this disclosure.

FIG. 2 is a block diagram of an example expandable decoy UAV 200 in accordance with teachings of this disclosure and which may be implemented in the decoy 120 of FIG. 1. The decoy UAV 200 of the illustrated example includes a structure (e.g., a structural frame, a structural assembly, a spaceframe, etc.) 202 with an expander 204, which can be implemented as a pre-formed high pressure Mylar®, an inflator 206, and an expandable body 207. In this example, an avionics controller 208 is implemented by and/or includes an autopilot (AP) processor 210, which can be implemented as a hobby-grade processor (e.g., microprocessor). Further, the example decoy UAV 200 includes a propulsion device or system (e.g., a means for moving) 212 that includes an electric motor (e.g., a hobby-grade motor) 214, a battery 216 and control surfaces (e.g., wings, flaps, stabilizers, rudders, etc.) 217. In the illustrated example, flight controls 218 include servos 220 and a decoy controller 222 which, in turn, includes a decoy radio 224 and decoy thermal device (e.g., a heater) 226. In some examples, the decoy UAV 200 includes a parachute 230.

To provide structure for and/or support the decoy UAV 200, the structure 202, which is implemented as a frame in this example, positions and/or houses various components of the decoy UAV 200 with a sufficient strength to withstand flight and/or maneuvers associated with flight (e.g., landing, take-off, etc.). Further, the structure 202 includes the aforementioned expandable body 207 that at least partially defines an external surface of the decoy UAV 200 and also supports and/or mounts the control surfaces 217 of the decoy UAV 200.

To guide and move the decoy UAV 200, the propulsion device 212 includes the electric motor 214 and movement of the aforementioned control surfaces 217 via the servos 220 is directed by the avionics controller 208 and/or the flight controls 218. Further, in some examples, at least one of the electric motor 214, the servos 220 or actuation devices (e.g., actuators, solenoids, etc.) moving the control surfaces 217 is powered by the battery 216. However, any appropriate avionics or power scheme can be implemented instead.

In the illustrated example, to expand and/or fold the decoy UAV 200, the expander 204 is implemented to expand at least a portion of the expandable body 207 and/or the decoy UAV 200. Particularly, the expander 204 expands the aforementioned expandable body 207 by moving and/or rotating components associated with the expandable body 207, as will be discussed in greater detail below in connection with FIGS. 3A-3D. Additionally or alternatively, at least a portion of the decoy UAV 200 is folded and/or rotated by the expander 204 to expand the decoy UAV 200. As a result, the decoy UAV 200 is expanded to mimic a geometry and/or footprint of a mission aircraft (e.g., the aircraft 100). In turn, the example decoy UAV 200 can draw attacks away from the mission aircraft.

In some examples, to enact decoy functionality of the decoy UAV 200, the decoy UAV 200 includes the decoy radio 224 to transmit RF signals that mimic or simulate RF signals transmitted from the aforementioned mission aircraft. Additionally or alternatively, the decoy thermal 226 emits heat to mimic a heat signature of the mission aircraft. However, any other type of decoy implementation can be utilized instead.

In some examples, the decoy UAV 200 includes countermeasures (e.g., flares, jamming devices, etc.). In some examples, the decoy UAV 200 includes external Mylar® surfaces and/or components. In some examples, the decoy UAV 200 is directed to collide with an enemy target, structure and/or aircraft. In some such examples, a Mylar® surface or portion of the decoy UAV 200 can be brought into contact with a target power station or electrical equipment for power disruption. In other examples, the decoy UAV 200 is deliberately crashed (e.g., crashed to the ground) to provide the illusion that the mission aircraft has been destroyed.

Figure 3A:
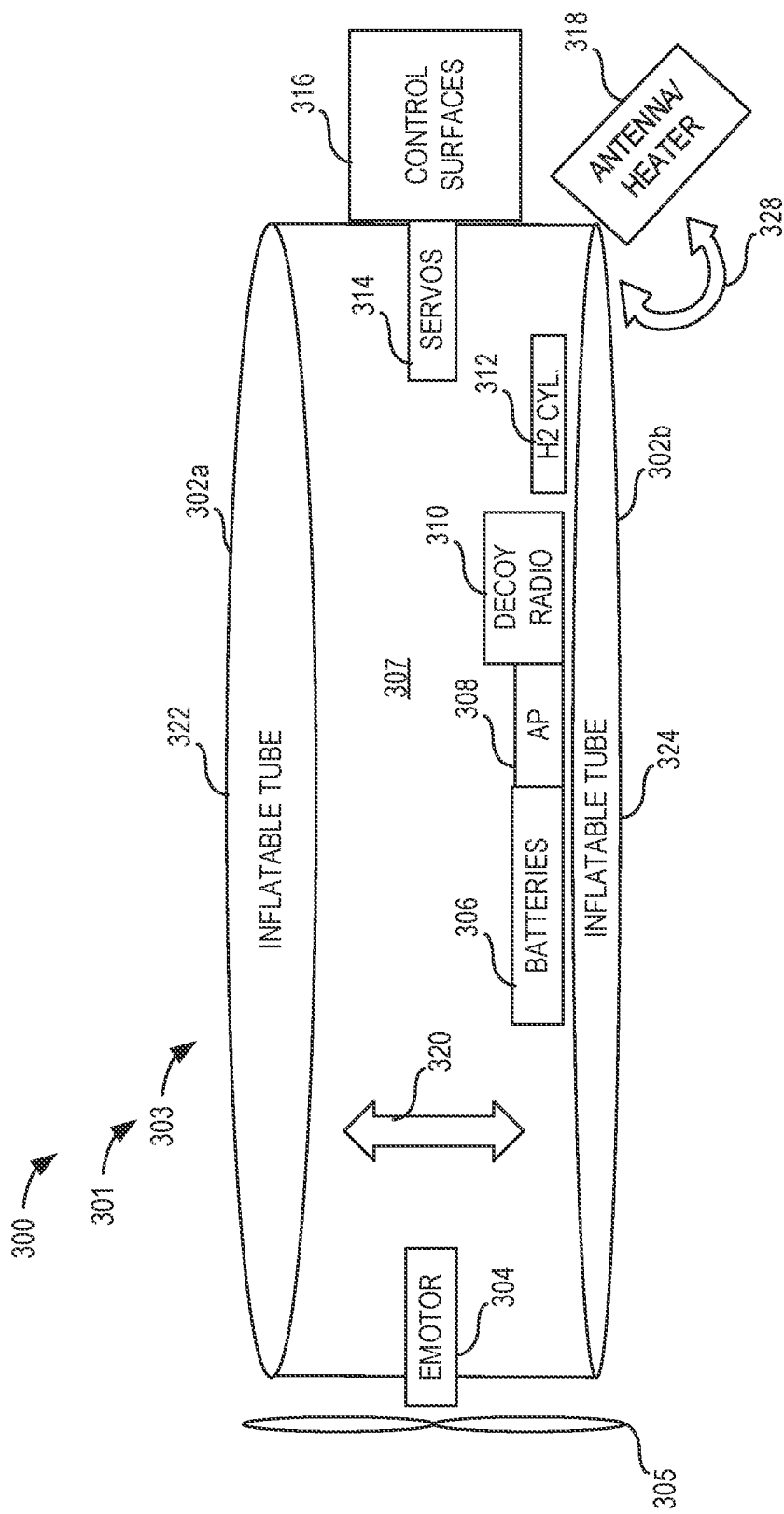

FIGS. 3A-3D are cross-sectional views of example expandable decoy UAVs 300, 330, 350, 370, respectively. Turning to FIG. 3A, the example decoy UAV 300 is shown with an example expandable body (means for supporting) 301. In the illustrated example, the decoy UAV 300 is expandable via an expander (e.g., a means for expanding the means for supporting) 303, which includes inflatable tubes or balloons 302a,302b, which are at least partially composed of Mylar® in this example. The example inflatable tubes 302 and/or the expandable body 301 at least partially define an at least partially enclosed structure (e.g., a walled structure, an enclosed structure, enclosure) 307. Further, the decoy UAV 300 includes a propulsion device (e.g., a means for moving) with a motor (e.g., an electric motor, a hydrogen powered motor) 304 and a propeller 305 in this example. Further, the decoy UAV 300 includes batteries 306, an autopilot controller 308, a decoy radio 310, a fuel cylinder (e.g., a hydrogen ($H_2$) cylinder) 312, servos 314, control surfaces 316, and a foldable fin 318, which contains both an antenna and a heater in this example.

To expand the decoy UAV 300, the example inflatable tubes 302a, 302b of the expandable body 301 are inflated (e.g., at least partially filled with a gas). In the illustrated example, the inflatable tubes 302a, 302b are expanded to expand the expandable body 301 in a direction generally indicated by double arrows 320. In particular, an upper surface 322 of the expandable body 301 is moved away from a lower surface 324 of the expandable body 301, thereby causing the expandable body 301 to expand to a footprint and/or general outer geometry of a mission aircraft. In some examples, the expandable body 301 is expanded to match at least a portion or an entirety of an external shape of the mission aircraft.

In some examples, the batteries 306, the autopilot controller 308, and the decoy radio 310 are positioned within the expandable body 301, the enclosed structure 307 and/or at least one of the inflatable tubes 302a, 302b. In some examples, the foldable fin 318 is rotatable relative to the decoy UAV 300, as generally indicated by a double arrow 328, to more effectively transmit RF signals or emit heat signatures from the decoy UAV 300 after the UAV 300 has been deployed and/or expanded. Additionally or alternatively, a degree to which the expandable body 301 is expanded is varied based on a desired footprint to mimic the mission aircraft. In other words, the degree of expansion of the expandable body 301 can be varied based on different mission aircraft geometries and/or footprints for a high degree of versatility in mimicking different aircraft types.

FIG. 3B depicts the example decoy UAV 330. The decoy UAV 330 is similar to the decoy UAV 300 but, instead, includes an expandable body (e.g., a means for supporting) 331 with an expander (e.g., a means for expanding) 333, which includes pivotable members (e.g., pivotable bodies) 332. The pivotable members 332 are rotatably and/or pivotably coupled to an upper surface (e.g., an upper panel) 334 at pivots 336. Further, the pivotable members 332 are rotatably coupled to a lower surface (e.g., a lower panel) 338 at pivots 340.

To expand the expandable body 331, the pivotable members 332 are rotated (e.g., via a motor, a solenoid and/or an actuator), as generally indicated by double arrows 342, thereby causing the upper surface 334 to be moved away from the lower surface 338. In the illustrated example, the pivotable members 332 are moved in unison (e.g., via a four-bar linkage mechanism). Additionally or alternatively, heights of the pivotable members 332 can be adjusted, as generally indicated by double arrows 344. For example, an actuator or solenoid can be implemented to adjust a longitudinal length of at least one of the pivotable members 332.

In some examples, electronics, control circuitry, energy storage and/or equipment 346 can be disposed within the expandable body 331. Additionally or alternatively, batteries and/or energy storage are disposed within the expandable body 331.

Figure 3C:
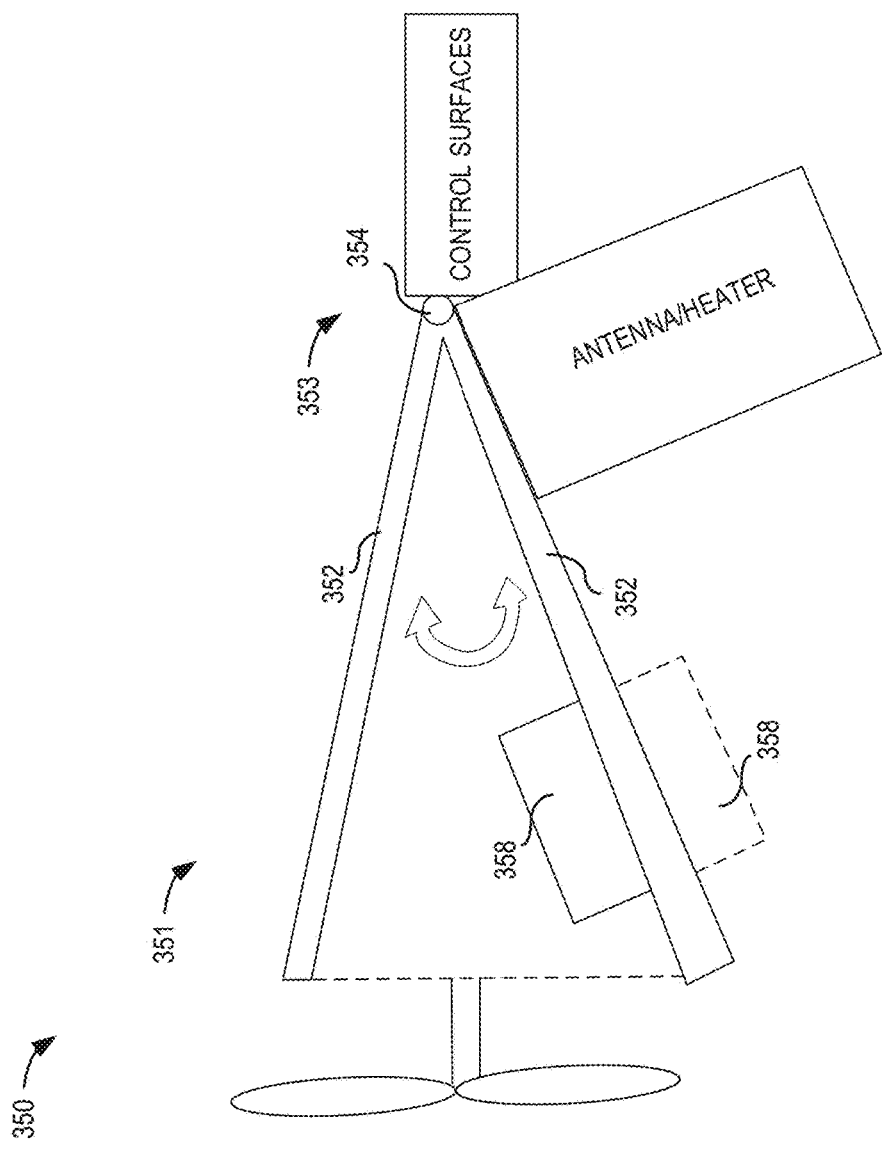

Turning to FIG. 3C, the example decoy UAV 350 is shown. The decoy UAV 350 of the illustrated example includes an expandable body (e.g., a means for supporting) 351 and an expander (e.g., means for expanding) 353 with foldable panels 352, which are rotatable relative to one another via a pivot 354. In this example, electronics and/or equipment 358 are positioned within the expandable body 351. However, in other examples, the electronics and/or equipment 358 can be mounted or stored externally on the decoy UAV 350.

Figure 3D:
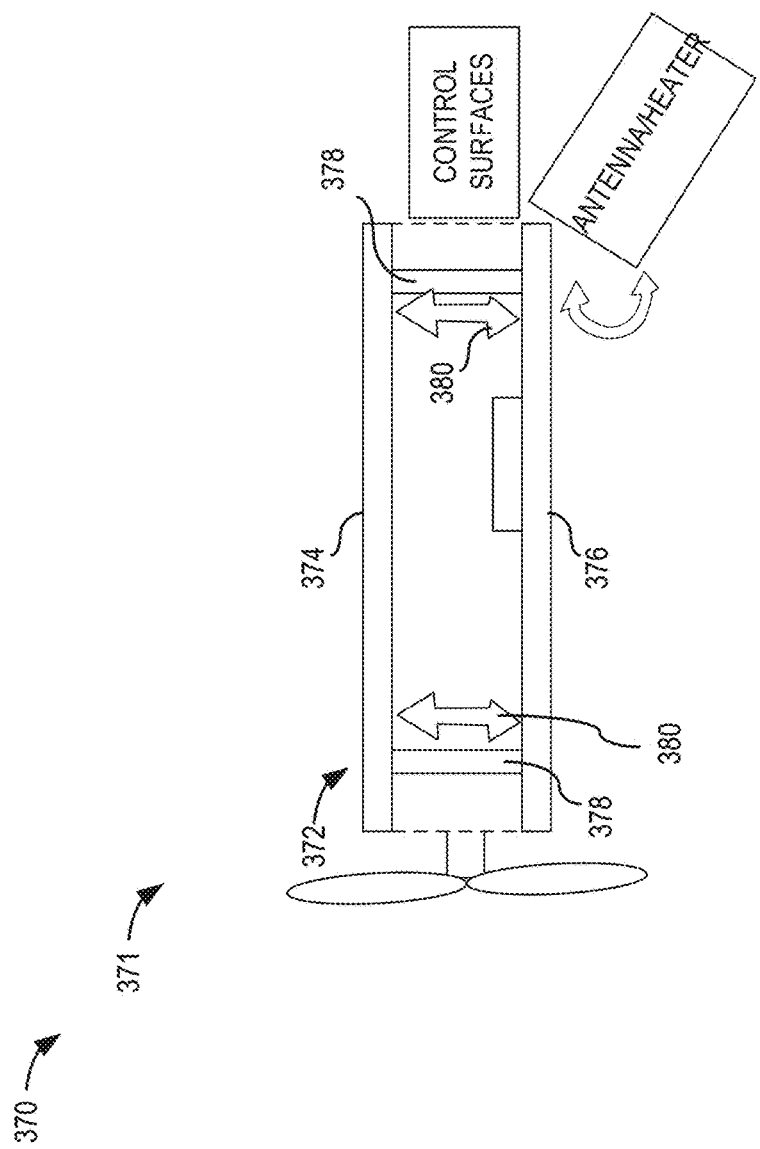

FIG. 3D depicts the example decoy UAV 370. In the illustrated example the decoy UAV 370 includes an expandable body 371 and an expander (e.g., a means for expanding) 372. The example expandable body 371 includes an upper surface (e.g., an upper panel) 374 positioned on an upper side of the decoy UAV 370. The expander 372 also includes a lower surface (e.g., a lower panel) 376 is positioned on a lower side opposite the upper side. In this example, height-adjustable rods (e.g., expandable rods, variable longitudinal length rods, variable length rods, etc.) 378 are operatively coupled between the upper surface 374 and the lower surface 376.

In operation, longitudinal lengths of the height adjustable rods 378 are adjusted to move the upper surface 374 and the lower surface 376 apart, as generally indicated by a double arrow 380. In some examples, the heights of the height adjustable rods 378 are adjusted via a solenoid or actuator. In some examples, ones of the height adjustable rods 378 are adjusted to different heights (e.g., to angle the upper surface 374 and the lower surface 376 from one another).

While examples disclosed herein are shown in the context of expanding geometries, examples disclosed herein can also be directed to contracting geometries. Further, while examples disclosed herein are shown generally with a vertical/height-wise expansion, examples disclosed herein can be applied to horizontal expansion or contraction (e.g., an expandable decoy that can be expanded or contracted in both horizontal and vertical directions).

Figure 4:
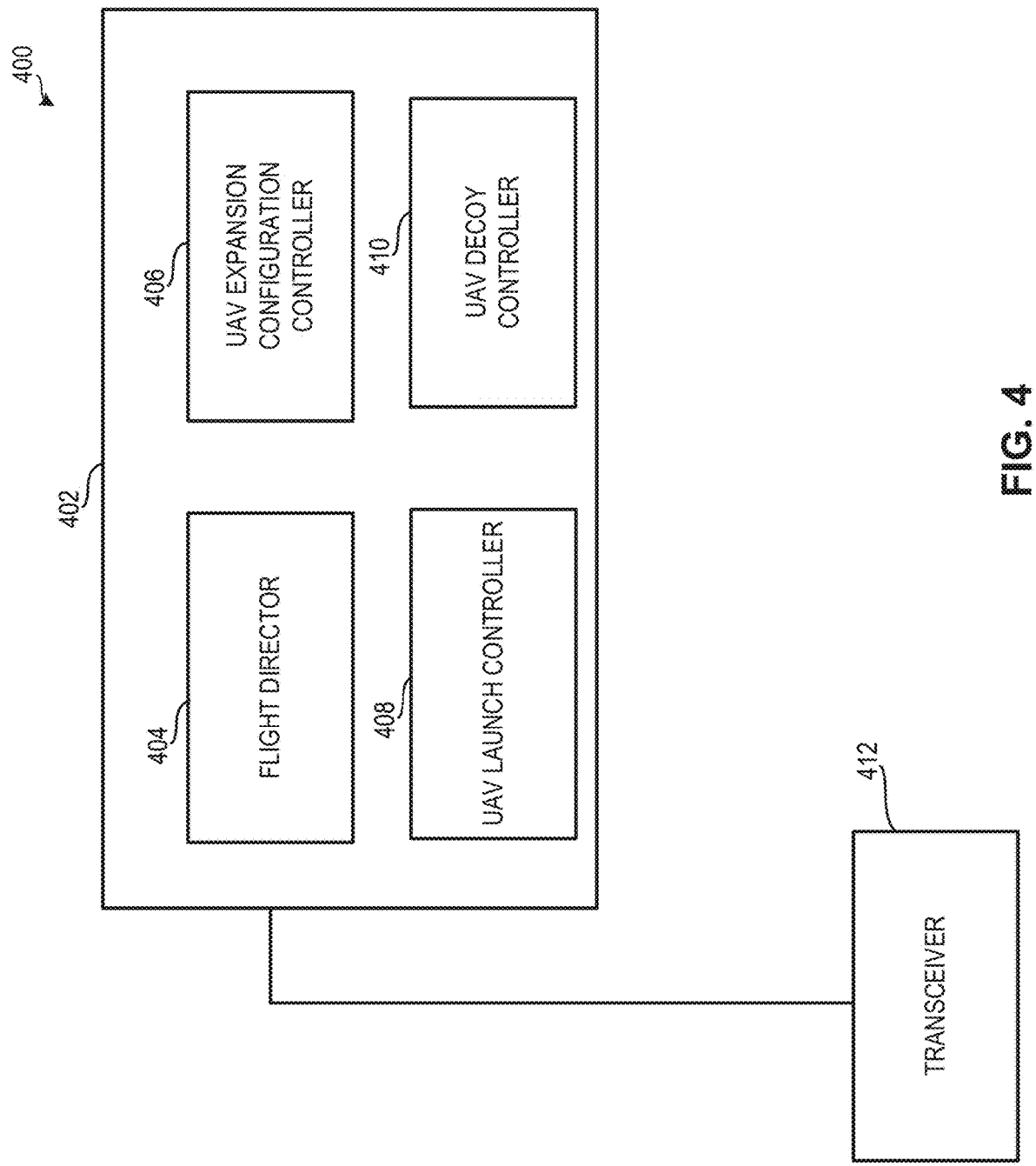
FIG. 4 is a schematic overview of an example decoy UAV control system that can be implemented in examples disclosed herein.

FIG. 4 is a schematic overview of an example decoy UAV control system 400 that can be implemented in examples disclosed herein. In particular, the decoy UAV control system 400 of the illustrated example can be implemented in a decoy UAV (e.g., the decoy UAV 200, the decoy UAV 300, the decoy UAV 330, the decoy UAV 350, the decoy UAV 370), the network 124, a command center controlling the decoy UAV and/or a deployment vehicle associated with the decoy UAV (e.g., the aircraft 100). The UAV decoy control system 400 includes a decoy analyzer 402, which includes a flight director 404, a UAV expansion configuration controller 406, a UAV launch controller 408 and a UAV decoy controller 410. Further, the example decoy analyzer 402 is communicatively coupled to a transceiver 412.

The flight director 404 of the illustrated example directs navigation and/or movement of the decoy UAV. In this example, the flight director 404 is implemented to direct movement of the decoy UAV to mimic movement of a mission aircraft (e.g., the aircraft 100) or navigate the decoy UAV along a path the mission aircraft is/was headed toward (e.g., to follow the mission aircraft, to proceed ahead of the mission aircraft along the path, etc.). In some other examples, the flight director 404 coordinates movement of the decoy UAV along with the mission aircraft.

The example UAV expansion configuration controller 406 directs and/or causes the decoy UAV to expand. In some examples, the decoy UAV is caused to expand during launch thereof (e.g., via a spring-loaded action, etc.). Additionally or alternatively, the expanding configuration controller 406 controls a degree of expansion (e.g., a determined degree of expansion based on a footprint) of the decoy UAV. In some such examples, the amount of expansion may be calculated and/or determined based on a provided footprint (e.g., a footprint of a mission aircraft) or overall geometry (e.g., a an outer geometric contour) corresponding to a specific mission aircraft type. In other words, in some examples, the amount of expansion can be varied based on the type of aircraft the decoy UAV is to mimic. In some examples, the UAV expansion configuration controller 406 determines and/or calculates a degree to which the decoy is to be expanded based on a provided footprint. In some examples, the decoy UAV is expanded to mimic a size of a manned aircraft.

In some examples, the UAV launch controller 408 causes the decoy UAV to be deployed or launched (e.g., from the aircraft 100, a runway, land vehicle, etc.). In this particular example, the flight director 404 causes the decoy UAV to be launched from the mission aircraft when the mission aircraft is positioned proximate or at a mission area. In some examples, the UAV launch controller 408 determines conditions pertaining to an imminent or anticipated attack on the mission aircraft.

The UAV decoy controller 400 of the illustrated example controls and/or selects decoy implementations of the decoy UAV. For examples, the UAV decoy controller 410 can control a degree of heat emitted from the decoy UAV to mimic a heat signature of the mission aircraft. Additionally or alternatively, the decoy controller 410 controls RF signals (e.g., signals and/or identifiers) to be transmitted from the decoy UAV to mimic RF signals transmitted from the mission aircraft.

While an example manner of implementing the UAV decoy control system 400 of FIG. 4 is illustrated in FIG. 4, one or more of the elements, processes and/or devices illustrated in FIG. 4 may be combined, divided, re-arranged, omitted, eliminated and/or implemented in any other way. Further, the example flight director 404, the example UAV expansion configuration controller 406, the example UAV launch controller 408, the example UAV decoy controller 410 and/or, more generally, the example UAV decoy control system 400 of FIG. 4 may be implemented by hardware, software, firmware and/or any combination of hardware, software and/or firmware. Thus, for example, any of the example flight director 404, the example UAV expansion configuration controller 406, the example UAV launch controller 408, the example UAV decoy controller 410 and/or, more generally, the example UAV decoy control system 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, flight director 404, the example UAV expansion configuration controller 406, the example UAV launch controller 408, and/or the example UAV decoy controller 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example UAV decoy control system 400 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the UAV decoy control system 400 of FIG. 4 is shown in FIG. 4. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example UAV decoy control system 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 500 begins as a decoy UAV (e.g., the decoy UAV 200, the decoy UAV 300, the decoy UAV 330, the decoy UAV 350, the decoy UAV 370) is to be launched to divert hostile measures away from a mission aircraft, which is also implemented as a UAV (i.e., a mission UAV) in this example. In this example, the decoy UAV is being launched from the mission UAV during flight of the mission UAV.

At block 502, in some examples, the flight 404 director causes the mission UAV to be moved to a mission area (e.g., a target location, an operational area, etc.). In this example, the mission UAV is carrying the aforementioned decoy UAV while the decoy UAV is unexpanded.

At block 504, the UAV launch controller 408 deploys and/or causes deployment of the decoy UAV. In this example, the decoy UAV is launched from the mission UAV while the mission UAV is in flight.

At block 506, the UAV expansion configuration controller 406 causes the decoy UAV to be expanded via an expander (e.g., an actuated expander, a spring-loaded expander, etc.). In this example, the decoy UAV is expanded after being launched. In other examples, the decoy UAV is expanded prior to or during launch. In yet other examples, the decoy UAV is deployed with the parachute 230 and, subsequently, launched and/or expanded from the parachute 230.

At block 508, the flight director 404 of the illustrated example directs flight and/or navigation of the decoy UAV. In some examples, the decoy UAV is directed based on a flight path of the mission UAV. Additionally or alternatively, the flight director 404 directs movement of the decoy UAV to mimic movement of the mission UAV.

At block 510, in some examples, the UAV decoy controller 410 causes the decoy UAV to transmit RF signals to mimic RF signals typically transmitted from the mission UAV.

At block 512, in some examples, the UAV decoy controller 410 causes the decoy UAV to emit heat to mimic a heat signature of the mission UAV. The decoy controller 410 may control a duration and/or a time-based heat emission pattern associated with the mission UAV.

At block 514, in some examples, the flight director 404 directs the decoy UAV to impact a target and the process ends. For example, the decoy UAV can be directed to fly into enemy aircraft or ground structures (e.g., buildings, utility areas, communication areas, power areas, etc.).

Figure 5:
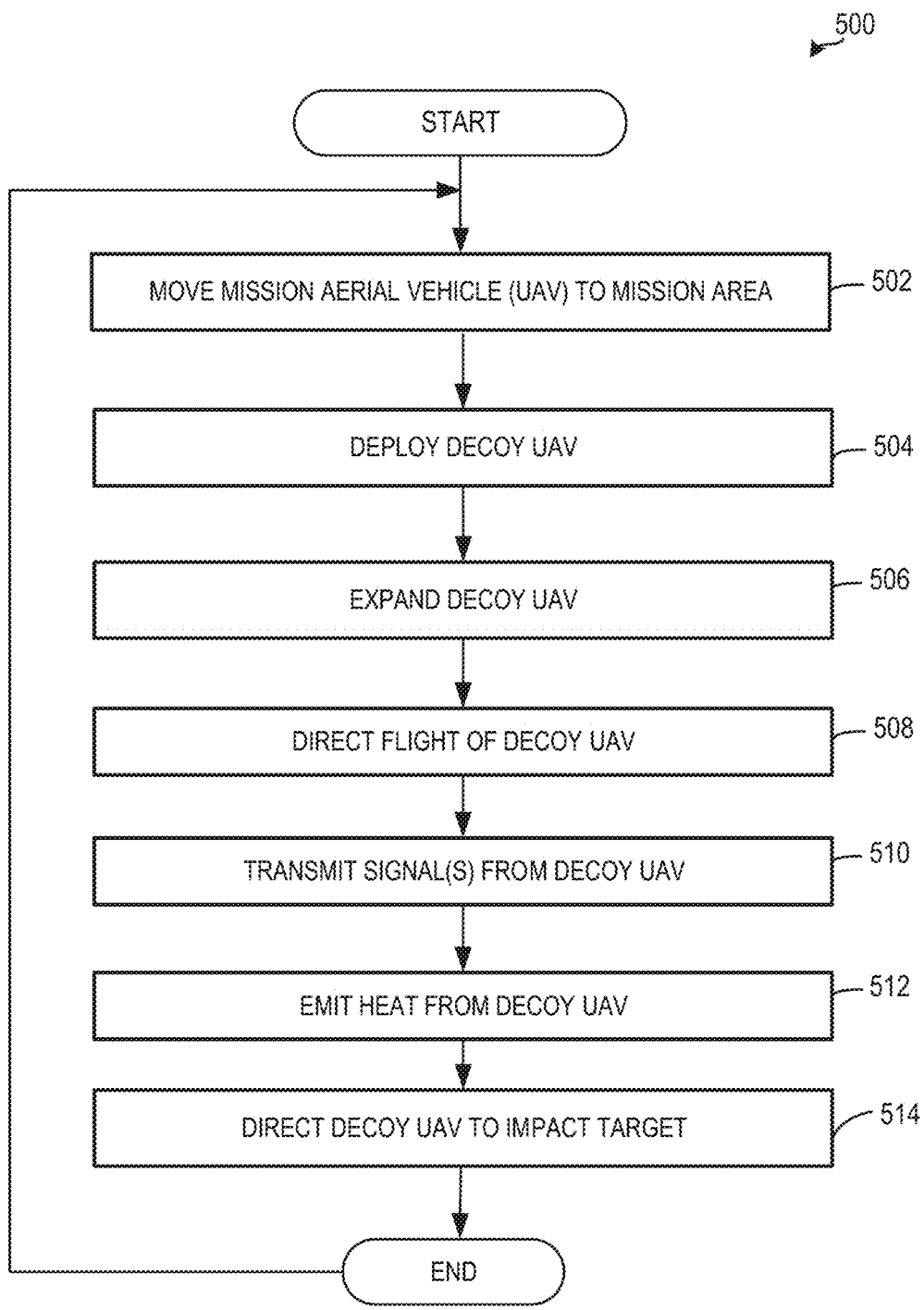
FIG. 5 is a flowchart representative of an example method to implement examples disclosed herein.
Figure 6:
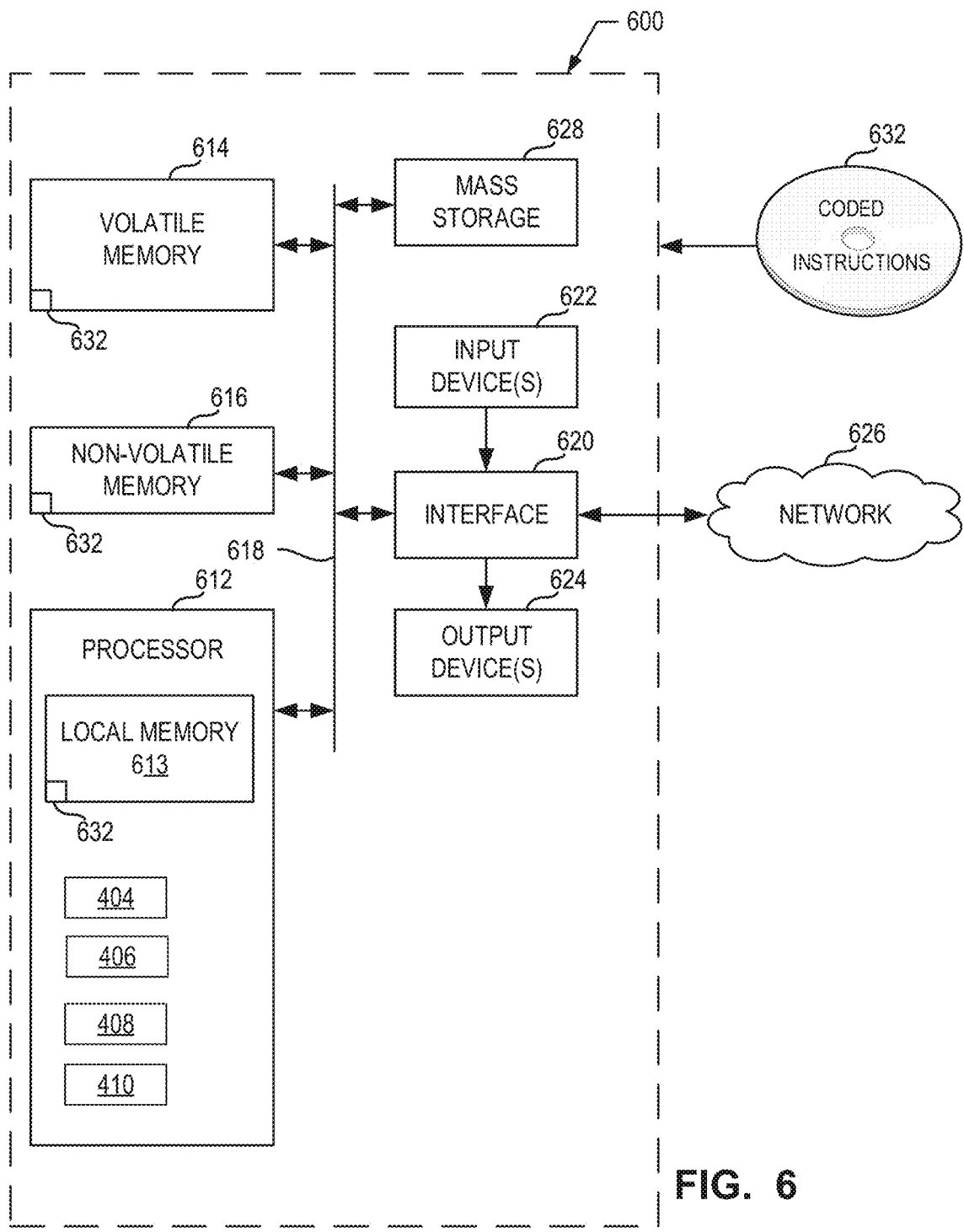
FIG. 6 is a block diagram of an example processing platform structured to execute the instructions of FIG. 5 to implement examples disclosed herein.

FIG. 6 is a block diagram of an example processor platform 600 structured to execute the instructions of FIG. 5 to implement the decoy UAV control system 400 of FIG. 4. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flight director 404, the example expanding configuration controller 406, the UAV launch controller 408 and the UAV decoy controller 410.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that enable effective and relatively low cost implementation of decoy aircraft that are able to draw hostile attacks away from a mission aircraft. Thus, examples disclosed herein can prevent the mission aircraft from being damaged or destroyed and, thus, increase a likelihood of success of a mission being performed by the mission aircraft.

Example 1 includes a decoy UAV having an expandable body at least partially defining an exterior of the expandable decoy UAV, an expander to expand the expandable body to a desired footprint, and a propulsion device operatively coupled to the expandable body, the propulsion device to move the expandable decoy UAV.

Example 2 includes the expandable decoy UAV as defined in example 1, further including an antenna to transmit a radio frequency (RF) signal associated with a mission aircraft.

Example 3 includes the expandable decoy UAV as defined in any of examples 1 or 2, further including a heater to emit a heat signature associated with a mission aircraft.

Example 4 includes the expandable decoy UAV as defined in any of examples 1 to 3, wherein the expander includes a pivotable body to rotate and expand the expandable body.

Example 5 includes the expandable decoy UAV as defined in any of examples 1 to 4, wherein the expander includes a variable length rod to expand the expandable body.

Example 6 includes the expandable decoy UAV as defined in any of examples 1 to 5, wherein the expandable body includes an inflatable balloon.

Example 7 includes the expandable decoy UAV as defined in example 6, further including control circuitry disposed within the inflatable balloon.

Example 8 includes the expandable decoy UAV as defined in any of examples 1 to 7, wherein the expandable body includes an upper surface and a lower surface opposite the upper surface, the expander to move the upper surface and the lower surface apart from one another.

Example 9 includes the expandable decoy UAV as defined in any of examples 1 to 8, wherein the expandable body at least partially defines a control surface of the expandable decoy UAV.

Example 10 includes the expandable decoy UAV as defined in any of examples 1 to 9, wherein the expander includes first and second pivoting bodies, and a pivot to pivotably couple the first and second pivoting bodies together, wherein at least one of the first or second pivoting bodies is rotated to expand the expandable body.

Example 11 includes a method of operating an expandable decoy UAV. The method includes deploying the expandable decoy UAV, expanding, via an expander, an expandable body of the expandable decoy UAV to a desired footprint, the expandable body at least partially defining an exterior surface of the expandable decoy UAV, and directing, by executing an instruction with at least one processor, a propulsion device of the expandable decoy UAV to move the expandable decoy UAV.

Example 12 includes the method as defined in example 11, further including emitting heat from a heater to mimic a heat signature associated with a mission aircraft.

Example 13 includes the method as defined in any of examples 11 or 12, wherein expanding the expandable body includes inflating an inflatable balloon.

Example 14 includes the method as defined in any of examples 11 to 13, wherein expanding the expandable body includes moving an upper surface of the expandable body and a lower surface of the expandable body that is opposite the upper surface apart from one another.

Example 15 includes the method as defined in any of examples 11 to 14, wherein expanding the expandable body includes rotating first and second pivoting bodies about a pivot.

Example 16 includes the method as defined in any of examples 11 to 15, further including emitting a radio frequency (RF) signal to mimic an RF signal associated with a mission aircraft.

Example 17 includes a non-transitory machine readable medium including instructions which, when executed, cause at least one processor to cause an expandable decoy UAV to deploy, cause an expandable body of the expandable decoy UAV to expand to a desired footprint via an expander, the expandable body at least partially defining an exterior surface of the expandable decoy UAV, and direct a propulsion system to move the expandable decoy UAV.

Example 18 includes the non-transitory machine readable medium as defined in example 17, wherein the at least one processor is further caused to direct a heater to emit heat to mimic a heat signature from a mission aircraft.

Example 19 includes the non-transitory machine readable medium as defined in any of examples 17 or 18, wherein the at least one processor is further caused to direct a transceiver to emit a radio frequency (RF) signal to mimic an RF signal associated with a mission aircraft.

Example 20 includes the non-transitory machine readable medium as defined in any of examples 17 to 19, wherein the at least one processor is further caused to determine a footprint of a mission aircraft, and determine a degree of expansion of the expandable body based on the footprint.

Example 21 includes an expandable decoy unmanned aerial vehicle (UAV) having means for supporting the expandable decoy UAV, means for expanding the means for supporting to a desired footprint, and means for moving the expandable decoy UAV.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein includes examples of UAVs and/or aircraft, examples disclosed herein can be applied to any appropriate application of decoys or vehicles including, but not limited to, spacecraft, submersibles, watercraft, etc.

The following claims are hereby incorporated into this Detailed Description by this reference, with each claim standing on its own as a separate embodiment of the present disclosure.

What is claimed is:

1. An expandable decoy unmanned aerial vehicle (UAV) comprising:
   an expandable body at least partially defining an exterior of the expandable decoy UAV, wherein the expandable body includes an upper surface and a lower surface opposite the upper surface,
   the expandable body configured to be expanded to a desired footprint by moving the upper surface and the lower surface apart from one another; and
   a propulsion device operatively coupled to the expandable body, the propulsion device to move the expandable decoy UAV.

2. The expandable decoy UAV as defined in claim 1, further including an antenna to transmit a radio frequency (RF) signal associated with a mission aircraft.

3. The expandable decoy UAV as defined in claim 1, further including a heater to emit a heat signature associated with a mission aircraft.

4. The expandable decoy UAV as defined in claim 1, wherein a pivotable body is to rotate and expand the expandable body.

5. The expandable decoy UAV as defined in claim 1, wherein an actuator is to move a variable length rod to expand the expandable body.

6. The expandable decoy UAV as defined in claim 1, wherein the expandable body is an inflatable balloon.

7. The expandable decoy UAV as defined in claim 1, wherein the upper surface is opposite the lower surface, wherein an actuator is to move the upper surface and the lower surface apart from one another.

8. The expandable decoy UAV as defined in claim 1, wherein the expandable body at least partially defines a control surface of the expandable decoy UAV.

9. The expandable decoy UAV as defined in claim 1, further including an actuator to move:
first and second pivoting bodies; and
a pivot to pivotably couple the first and second pivoting bodies together, wherein at least one of the first or second pivoting bodies is rotated to expand the expandable body.

10. An expandable decoy unmanned aerial vehicle (UAV) comprising:
an expandable body at least partially defining an exterior of the expandable decoy UAV, wherein the expandable body includes an inflatable balloon,
the expandable body configured to be expanded to a desired footprint by moving an upper surface of the expandable body and a lower surface of the expandable body apart from one another; and
a propulsion device operatively coupled to the expandable body, the propulsion device to move the expandable decoy UAV.

11. A method of operating an expandable decoy unmanned aerial vehicle (UAV), the method comprising:
deploying the expandable decoy UAV;
expanding an expandable body of the expandable decoy UAV to a desired footprint, the expandable body at least partially defining an exterior surface of the expandable decoy UAV, wherein the expandable body includes an upper surface and a lower surface opposite the upper surface, the expandable body configured to be expanded by moving the upper surface and the lower surface apart from one another; and
directing, by executing an instruction with at least one processor, a propulsion device of the expandable decoy UAV to move the expandable decoy UAV.

12. The method as defined in claim 11, further including emitting heat from a heater to mimic a heat signature associated with a mission aircraft.

13. The method as defined in claim 11, wherein expanding the expandable body includes inflating an inflatable balloon.

14. The method as defined in claim 11, wherein expanding the expandable body includes rotating first and second pivoting bodies about a pivot.

15. The method as defined in claim 11, further including emitting a radio frequency (RF) signal to mimic an RF signal associated with a mission aircraft.

16. A non-transitory machine readable medium comprising instructions which, when executed, cause at least one processor to:
cause an expandable decoy UAV to deploy;
cause an expandable body of the expandable decoy UAV to expand to a desired footprint, the expandable body at least partially defining an exterior surface of the expandable decoy UAV, wherein the expandable body includes an upper surface and a lower surface opposite the upper surface, the expandable body configured to be expanded by moving the upper surface and the lower surface apart from one another; and
direct a propulsion device to move the expandable decoy UAV.

17. The non-transitory machine readable medium as defined in claim 16, wherein the at least one processor is further caused to direct a heater to emit heat to mimic a heat signature from a mission aircraft.

18. The non-transitory machine readable medium as defined in claim 16, wherein the at least one processor is further caused to direct a transceiver to emit a radio frequency (RF) signal to mimic an RF signal associated with a mission aircraft.

19. The non-transitory machine readable medium as defined in claim 16, wherein the at least one processor is further caused to:
determine a footprint of a mission aircraft, and
determine a degree of expansion of the expandable body based on the footprint.

20. An expandable decoy unmanned aerial vehicle (UAV) comprising:
means for supporting the expandable decoy UAV, the means for supporting including an upper surface and a lower surface opposite the upper surface;
means for expanding the means for supporting to a desired footprint, the means for expanding configured to move the upper surface and the lower surface apart from one another; and
means for moving the expandable decoy UAV.

* * * * *